United States Patent
Yoshida et al.

(10) Patent No.: US 9,442,249 B2
(45) Date of Patent: Sep. 13, 2016

(54) METHOD FOR PROCESSING SILICON-BASED WIRE OPTICAL WAVEGUIDE

(71) Applicant: NATIONAL INSTITUTE OF ADVANCED INDUSTRIAL SCIENCE AND TECHNOLOGY, Tokyo (JP)

(72) Inventors: Tomoya Yoshida, Ibaraki (JP); Youichi Sakakibara, Ibaraki (JP); Masahiko Mori, Ibaraki (JP); Takashi Nishi, Ibaraki (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 0 days.

(21) Appl. No.: 14/779,921

(22) PCT Filed: Jan. 20, 2014

(86) PCT No.: PCT/JP2014/050909
§ 371 (c)(1),
(2) Date: Sep. 24, 2015

(87) PCT Pub. No.: WO2014/156233
PCT Pub. Date: Oct. 2, 2014

(65) Prior Publication Data
US 2016/0047979 A1 Feb. 18, 2016

(30) Foreign Application Priority Data

Mar. 25, 2013 (JP) .................................. 2013-062421

(51) Int. Cl.
*G02B 6/125* (2006.01)
*G02B 6/02* (2006.01)
(Continued)

(52) U.S. Cl.
CPC .......... *G02B 6/125* (2013.01); *G02B 6/02395* (2013.01); *G02B 6/1223* (2013.01);
(Continued)

(58) Field of Classification Search
CPC G02B 6/125; G02B 6/02395; G02B 6/1223; G02B 6/13; G02B 6/132
See application file for complete search history.

(56) References Cited

U.S. PATENT DOCUMENTS

| 8,442,368 B1 * | 5/2013 | Reano ..................... G02B 6/132 385/29 |
| 2013/0028557 A1 * | 1/2013 | Lee .......................... G02B 6/26 385/28 |

FOREIGN PATENT DOCUMENTS

JP          2013178333          9/2013      ............... G02B 6/12

OTHER PUBLICATIONS

Peng Sun and Ronal M. Reano. Veritcal Chip-to-Chip Coupling Between Silicon Photonic Integrated Circuits Using Cantilever Couplers. 2011. Optical Society of Amer vol. 19. No. 5. pp. 4722-4727.*

(Continued)

*Primary Examiner* — Dah-Wei D Yuan
*Assistant Examiner* — Kristen A Dagenais
(74) *Attorney, Agent, or Firm* — Hayes Soloway PC

(57) ABSTRACT

A method is provided for processing a silicon-based wire optical waveguide, by which an optical transmission loss of the silicon-based wire optical waveguide due to ion irradiation with high energy is suppressed, and an end portion of the silicon-based wire optical waveguide that is three-dimensionally curved in a self-aligning manner is obtained. According to the method a protective film is selectively formed on the silicon-based wire optical waveguide exclusive of the end portion of the silicon-based wire optical waveguide; and ions are implanted to the silicon-based wire optical waveguide in a particular direction, so as to curve the end portion of the silicon-based wire optical waveguide to the particular direction in a self-alignment manner.

18 Claims, 6 Drawing Sheets

(51) Int. Cl.
G02B 6/132 (2006.01)
G02B 6/134 (2006.01)
G02B 6/245 (2006.01)
G02B 6/13 (2006.01)
G02B 6/122 (2006.01)
G02B 6/42 (2006.01)
G02B 6/12 (2006.01)

(52) U.S. Cl.
CPC ............... *G02B 6/13* (2013.01); *G02B 6/132* (2013.01); *G02B 6/1347* (2013.01); *G02B 6/245* (2013.01); *G02B 6/4214* (2013.01); *G02B 2006/12119* (2013.01); *G02B 2006/12121* (2013.01); *G02B 2006/12123* (2013.01); *G02B 2006/12176* (2013.01)

(56) References Cited

OTHER PUBLICATIONS

Kimin Jun. Jaeburn Joo and Joseph M. Jacobson. Focused Ion Beam-Assisted Bending of Silicon Nanowires for Complex Three Dimensional Structures. J. Vac. Sci. Technol. B 27(B). Nov./Dec. 2008. pp. 3043-3047.*

International Preliminary Report on Patentability with English translation of the Written Opinion issued in corresponding PCT Patent Appln. No. PCT/JP2014/050909 dated Oct. 8, 2015 (7 pgs).

International Search Report issued in application No. PCT/JP2014/050909, dated Feb. 10, 2014 (4 pgs).

Shiraishi, et al., "A Silicon-based spot-size converter between single-mode fibers and Si-wire waveguides using cascaded tapers", Applied Physics Letters, 91, 141120 (2007) (4 pgs).

Tokushima, et al., "Dual-Tapered 10-μm-Spot-Size converter with Double Core for Coupling Polarization-Independent Silicon Rib Waveguides to Single-Mode Optical Fibers", Applied Physics Express, 5 (2012) 022202 (4 pgs).

Taillaert, et al., "An out-of-plane grating coupler for efficient butt-coupling between compact planar waveguides and single-mode fibers", IEEE Journal of Quantum Electronics, vol. 38, No. 7, Jul. 2002, pp. 949-955 (7 pgs).

Taillaert, et al., "Grating couplers for coupling between optical fibers and nanophotonic waveguides", Japanese Journal of Applied Physics, vol. 45, No. 8A, 2006, pp. 6071-6077 (7 pgs).

Zheng, et al., "Optical proximity communication using reflective mirrors", Sep. 15, 2008/vol. 16, No. 19/Optics Express, pp. 15052-15058 (7 pgs).

Sun et al., "Cantilever couplers for intra-chip coupling to silicon photonic integrated circuits", Mar. 16, 2009/vol. 17, No. 6/Optics Express, pp. 4565-4574 (10 pgs).

Sun et al., "Vertical chip-to-chip coupling between silicon photonic integrated circuits using cantilever couplers", Feb. 28, 2011/vol. 19, No. 5/Optics Express, pp. 4722-4727 (6 pgs).

Jun et al., "Focused Ion beam-assisted bending of silicon nanowires for complex three dimensional structures", Journal of Vacuum Science & Technology B, Nov. 2009, vol. 27, No. 6, pp. 3043-3047 (5 pgs).

Yoshida et al., "Vertically-curved silicon waveguide fabricated by ion-induced bending method for vertical light coupling", 10th International Conference on Group IV Photonics (GFP), 2013, 08, pp. 89-90 (3 pgs).

Yoshida et al., "Vertically-Curved Silicon Waveguide using Ion-Implantation Method", Dai 74 Kai The Japan Society of Applied Physics Shuki Gakujutsu Koenkai Koen Yokoshu, Aug. 31, 2013 (2 pgs).

* cited by examiner

Fig. 4 (A) 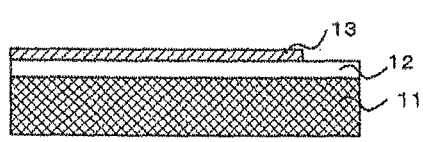 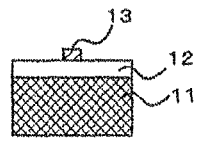 Fig. 4 (B)

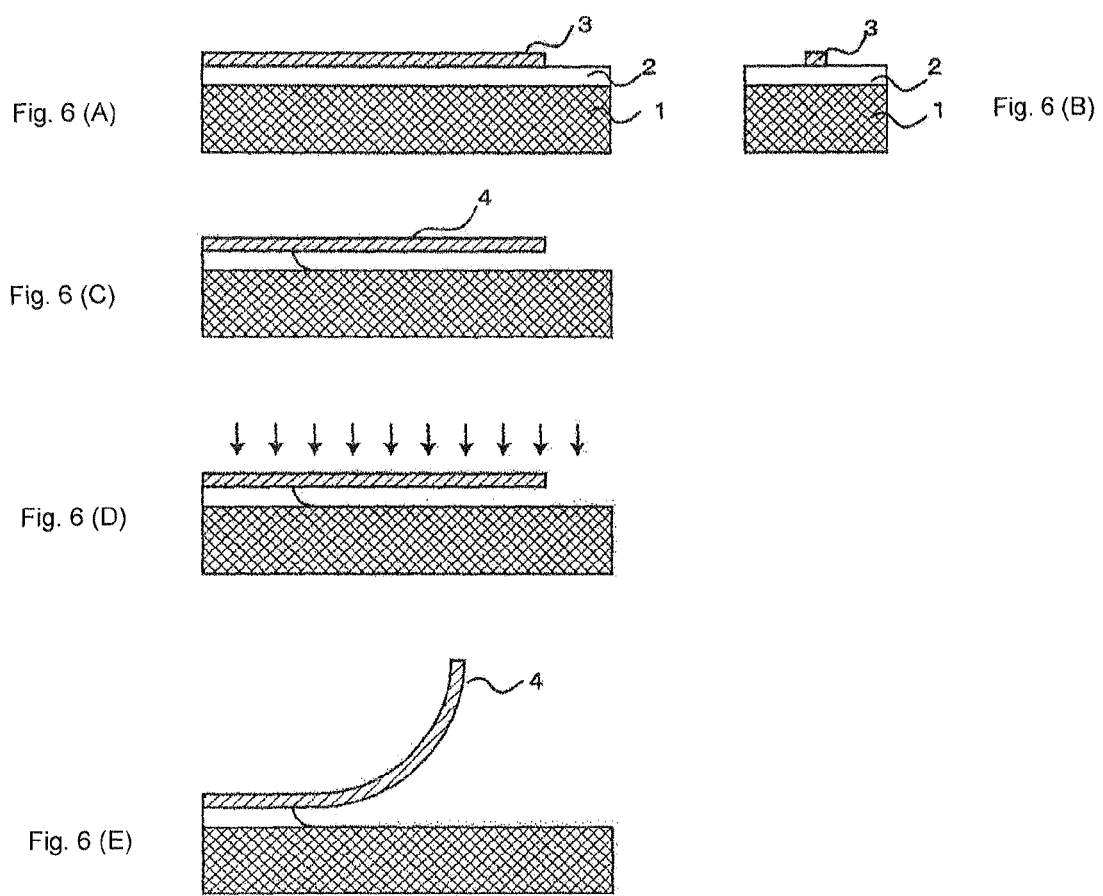

METHOD FOR PROCESSING SILICON-BASED WIRE OPTICAL WAVEGUIDE

TECHNICAL FIELD

The present invention relates to a method for processing a silicon-based wire optical waveguide having an end portion the silicon-based wire optical waveguide that is three-dimensionally curved.

BACKGROUND ART

In recent years, there have been active researches and developments made for an optical circuit having, as a major constitutional component, a silicon-based wire optical waveguide using single crystal silicon, amorphous silicon, or a silicon compound material, such as silicon oxide, silicon nitride and silicon oxynitride, as a core of the optical waveguide.

This is because a large difference in specific refractive index is obtained between a silicon-based core material and a quartz-based clad material, and therefore even when the optical waveguide is bending to a small curve radius, the radiation loss of light may be prevented, thereby achieving a considerable miniaturization an optical circuit. Furthermore, the production process of a silicon CMOS LSI may be applied thereto, and therefore reduction in production cost due to mass production is being expected.

In general, an optical circuit having a silicon-based wire optical waveguide as a major constitutional component is formed in a single plane due to the manufacturing process reasons, and it is the most ordinary practice that input and output of light to the optical circuit is performed through the cross section of the optical waveguide in the direction that is perpendicular to the cross section of the optical waveguide within the same plane as that having the optical circuit formed therein, i.e., the direction that is lateral to the plane having the optical circuit formed therein.

For example, a spot size convertor (SSC) having a wire optical waveguide with an apex thereof formed into a tapered shape or a reverse tapered shape is most ordinarily used, and variations thereof have been proposed (see, for example, Non Patent Literature 1 and Non Patent Literature 2). The principle thereof is as follows. The spot size of the propagated light is enlarged with the first core material in the form of a tapered shape or a reverse tapered shape, and the light is propagated through the second core having a larger size than the first core and having a covered apex, and optically coupled with a fiber or the like. The refractive indices of the materials have the relationship, (first core material)>(second core material)>(clad material). However, the structure is limited to be formed in a single plane due to the manufacturing process reasons, and the direction for input and output of light to an optical circuit using the SSC is limited to the lateral direction.

In input and output of light between the optical circuit having the silicon-based wire optical waveguide as a major constitutional component and the other optical devices, such as an optical fiber, a light source and a light receiver, however, various technical advantages, such as inspection of the silicon-based wire optical waveguide device in the stage of wafers, and mount of a light source and a light receiver in the perpendicular direction, may be obtained in the case where the optical circuit is coupled with the other devices in directions other than the in-plane direction, particularly the perpendicular direction.

As a method for coupling light in a direction that is different from the in-plane direction of an optical circuit having a silicon-based wire optical waveguide as a major constitutional component, such a method has been known that a plane diffraction grating coupler is formed at an end of the optical waveguide, and an optical device, such as an optical fiber, is coupled in a direction that is slightly tilted from the perpendicular direction (see Non Patent Literature 3 and Non Patent Literature 4).

Furthermore, there is a report of a method in which even in a rib optical waveguide, a tilted mirror is formed at an apex of an end of the optical waveguide, and thereby light is reflected upward (Non Patent Literature 5). Moreover, there is a recent report of a method in which a silicon-based wire optical waveguide itself is three-dimensionally curved upward and coupled with an optical fiber or an optical waveguide (Non Patent Literature 6 and Non Patent Literature 7).

Among these methods, the method of three-dimensionally curving a silicon-based wire optical waveguide itself upward is an excellent method since the method is free of limitation in wavelength band, which occurs in a plane diffraction grating coupler, and is also free of a problem of increased coupling loss due to the space between the end of the optical waveguide and the mirror, which occurs in the mirror reflection type method. For example, as an optical circuit having a silicon-based wire optical waveguide as a major constitutional component as shown in FIG. 5, the end portion, of the silicon-based wire optical waveguide is curved upward to achieve input and output of light from the above. It is impossible to produce the curved structure herein simultaneously with the process for producing the optical circuit, and therefore it is necessary to use a process technique for curving three-dimensionally upward the end portion of the silicon-based wire optical waveguide of the optical circuit having been produced in advance.

In practice, particularly, such a process technique is necessarily developed that is capable of being applied to an optical circuit, in which the constitutional element thereof may be broken when the circuit is subjected to a high temperature process, for example, an optical circuit formed on a circuit board having a metallic line, and an optical circuit board containing a metallic line for driving an active optical device formed on a single substrate.

As a method for curving three-dimensionally a silicon-based wire optical waveguide, such a method has been known that a silicon oxide film is formed by plasma CVD in an upper portion of the silicon-based wire optical waveguide, and the silicon-based wire optical waveguide is curved spontaneously by utilizing the difference in residual stress from the thermally oxidized silicon oxide film as the underlayer of the silicon-based wire optical waveguide (see Non Patent Literature 3).

A method of curving a silicon-based wire optical waveguide itself three-dimensionally upward is excellent as a method for coupling light in a direction that is different from the in-plane direction of the silicon-based wire optical waveguide formed therein.

However, the method, in which a silicon oxide film is formed by plasma CVD in an upper portion of the silicon-based wire optical waveguide, and the silicon-based wire optical waveguide is curved spontaneously by utilizing the difference in residual stress from the silicon oxide film formed by thermal oxidization as the underlayer of the silicon-based wire optical waveguide, has the following problems.

(1) It is necessary to form by dry etching a cantilever beam structure having a silicon-based wire optical waveguide that is held in vertical direction with a silicon oxide film and a thermally oxidized silicon oxide film, which are formed by plasma CVD, and such a complicated process is necessarily performed that after deeply etching the thick silicon oxide film, the upper part of the silicon substrate under the oxide film having the cantilever beam structure is bored.

(2) Due to the principle utilizing the difference in residual stress, the curvature is constant over the entire cantilever beam structure, and it is difficult to change the curvature locally.

(3) For directing the apex of the curved portion to an arbitrary direction, it is necessary to control strictly the length of the cantilever beam, the thicknesses of the upper and lower oxide films, the heating temperature, and the like, and a high processing accuracy is demanded.

(4) Due to the use of the difference in residual stress between the upper and lower oxide films, it is difficult to curve the optical waveguide in the case where the upper and lower oxide films are formed by the same film formation method.

(5) A high temperature heating process is required for providing a large curvature amount, and therefore it is impossible to apply the method to an optical circuit, in which the constitutional element thereof may be broken when the circuit is subjected to a high temperature process, for example, an optical circuit formed on a circuit board having a metallic line, and an optical circuit board containing a metallic line for driving an active optical device formed on a single substrate. Further, cost of the process will increase.

(6) It is considered that the most ideal structure of a three-dimensionally curved waveguide is the aforementioned SSC structure that is entirely curved three-dimensionally or the aforementioned SSC structure, the apex portion of which is three-dimensionally curved, since an SSC has superior performance to a plane diffraction grating coupler except for the point that an SSC is impossible to achieve optical coupling in the perpendicular direction. However, it is impossible in principle to curve by the method of Non Patent Literature 5 the structure containing not only the first core material but the second core material, the third core material, the clad material and the like, which are fabricated complicatedly.

For solving the aforementioned problems, as shown in FIG. 6, such a processing method of a silicon-based wire optical waveguide that an ion beam is implanted in the particular direction from the outside of the silicon-based wire optical waveguide having a cantilever beam structure, and thereby a stress is formed inside the wire structure itself to curve the optical waveguide, is proposed (see Patent Literature 1).

The summary of the aforementioned proposal will be described with reference to FIGS. 6(A) to 6(F).

(1) As shown in FIG. 6(A) and FIG. 6(B), which is a side view thereof, a silicon layer on a silicon oxide film, which is a support layer 2, formed on a silicon substrate 1, which is an optical circuit board, is processed by a lithography technique, so as to forma silicon-based wire optical waveguide 3.

(2) As shown in FIG. 6(C), apart of the support layer 2 is removed to make such a structure that an end portion 4 of the silicon-based wire optical waveguide 3 thus formed is extended into free space in the form of a cantilever beam from a flat end forming the silicon-based wire optical waveguide.

(3) The entire surface of the silicon substrate 1 forming the cantilever beam structure is irradiated with an ion beam in a particular direction above the substrate, as shown in FIG. 6(D), so as to curve upward the end portion 4 of the silicon-based wire optical waveguide having a cantilever beam structure, as shown in FIG. 6(E).

According to the method, the following advantages may be obtained, as compared to the ordinary processing method, in which a silicon-based wire optical waveguide is held with upper and lower oxide films.

(1) The upper and lower oxide films are unnecessary since the internal strain stress of silicon wire itself is utilized.

(2) The curvature may be controlled by controlling the implantation direction and the irradiation amount of the ion beam.

(3) A steep curvature with a curve radius of 5 µm or less may be formed, and thus the device may be miniaturized.

(4) The curved end portion may be extended in a self-aligning manner in the ion implantation direction.

(5) The method may be performed by a low temperature process, and thus may be applied to an optical circuit that is broken by a high temperature process.

(6) An ordinary SSC may be curved and then subjected to optical coupling from the upper and lower sides thereof. Furthermore, only by curving the first core material, the second core material may be formed in a subsequent step at the end portion thereof to constitute an SSC.

According to the advantages, an advantageous effect of achieving a processing method with high mass productivity may be obtained.

However, in the aforementioned proposal, the end portion of the silicon-based wire optical waveguide may be curved, but the portion of the silicon optical waveguide that is not intended to be curved is also subjected to ion irradiation with high energy, so as to cause a large optical transmission loss of approximately 60 db/mm, which prevents the method from being applied to practical use.

CITATION LIST

Patent Literature

Patent Literature 1: JP-A-2013-178333 (Japanese Patent Application No. 2012-41314)

Non Patent Literatures

Non Patent Literature 1: K. Shiraishi, et al., "A Silicon-based spot-size converter between single-mode fibers and Si-wire waveguides using cascaded tapers", Applied Physics Letters, 91, 141120 (2007)

Non Patent Literature 2: M. Tokushima, et al., "Dual-Tapered 10-µm-Spot-Size converter with Double Core for Coupling Polarization-Independent Silicon Rib Waveguides to Single-Mode Optical Fibers", Applied Physics Express, 5 (2012) 022202

Non Patent Literature 3: D. Taillaert, et al., "An out-of-plane grating coupler for efficient butt-coupling between compact planar waveguides and single-mode fibers", IEEE JOURNAL OF QUANTUM ELECTRONICS, VOL. 38, NO. 7, July, 2002, pp. 949-955 Non Patent Literature 4: D. Taillaert, et al., "Grating couplers for coupling between optical fibers and nanophotonic waveguides", Japanese Journal of Applied Physics, Vol. 45, No. 8A, 2006, pp. 6071-6077

Non Patent Literature 5: X. Zheng, et al., "Optical proximity communication using reflective mirrors", 15 Sep. 2008/ Vol. 16, No. 19/OPTICS EXPRESS, pp. 15052-15058

Non Patent Literature 6: P. Sun and R. M. Reano, "Cantilever couplers for intra-chip coupling to silicon photonic integrated circuits", 16 Mar. 2009/Vol. 17, No. 6/OPTICS EXPRESS, pp. 4565-4574

Non Patent Literature 7: P. Sun and R. M. Reano, "Vertical chip-to-chip coupling between silicon photonic integrated circuits using cantilever couplers", 28 Feb. 2011/Vol. 19, No. 5/OPTICS EXPRESS, pp. 4722-4727

SUMMARY OF INVENTION

Technical Problem

An object of the invention is to provide a method for processing a silicon-based wire optical waveguide, in which the ordinary method for processing a silicon-based wire optical waveguide is improved, by which an optical transmission loss of the silicon-based wire optical waveguide due to ion irradiation with high energy is suppressed, and an end portion of the silicon-based wire optical waveguide that is three-dimensionally curved in a self-aligning manner is obtained.

Solution to Problem

The measures for solving the problem are as follows.

(1) A method for processing a silicon-based wire optical waveguide, containing a step of preparing an optical circuit board having plural silicon-based wire optical waveguides formed through a supporting layer; a step, for an intended silicon-based wire optical waveguide that has an end portion among the silicon-based wire optical waveguides, of removing the supporting layer that is under the end portion of the silicon-based wire optical waveguide; a step of forming a protective film selectively on the silicon-based wire optical waveguide exclusive of the end portion of the silicon-based wire optical waveguide; and a step of implanting ions to the silicon-based wire optical waveguide in a particular direction, so as to curve the end portion of the silicon-based wire optical waveguide to the particular direction in a self-alignment manner.

(2) A method for processing a silicon-based wire optical waveguide, containing a step of preparing an optical circuit board having plural silicon-based wire optical waveguides formed through a supporting layer; a step, for an intended silicon-based wire optical waveguide that has an end portion among the silicon-based wire optical waveguides, of removing the supporting layer that is under the end portion of the silicon-based wire optical waveguide; a step of forming a protective film on the silicon-based wire optical waveguide inclusive of the end portion of the silicon-based wire optical waveguide; and a step of implanting ions to the silicon-based wire optical waveguide in a particular direction, so as to curve the end portion of the silicon-based wire optical waveguide to the particular direction in a self-alignment manner.

(3) A method for processing a silicon-based wire optical waveguide, containing a step of preparing an optical circuit board having plural silicon-based wire optical waveguides formed through a supporting layer; a step, for an intended silicon-based wire optical waveguide that has an end portion among the silicon-based wire optical waveguides, of removing the supporting layer that is under the end portion of the silicon-based wire optical waveguide; a step of forming a protective film selectively on the silicon-based wire optical waveguide exclusive of the end portion of the silicon-based wire optical waveguide; a step of forming second protective film on the end portion of the silicon-based wire optical waveguide and the protective film; and a step of implanting ions to the silicon-based wire optical waveguide in a particular direction, so as to curve the end portion of the silicon-based wire optical waveguide to the particular direction in a self-alignment manner.

(4) A method for processing a silicon-based wire optical waveguide, containing a step of preparing an optical circuit board having plural silicon-based wire optical waveguides formed through a supporting layer; a step, for an intended silicon-based wire optical waveguide that has an end portion among the silicon-based wire optical waveguides, of removing the supporting layer that is under the end portion of the silicon-based wire optical waveguide; a step of forming a protective film on the silicon-based wire optical waveguide inclusive of the end portion of the silicon-based wire optical waveguide; a step of selectively removing a part of the protective film that is on the end portion of the silicon-based wire optical waveguide; and a step of implanting ions to the silicon-based wire optical waveguide in a particular direction, so as to curve the end portion of the silicon-based wire optical waveguide to the particular direction in a self-alignment manner.

(5) The method for processing a silicon-based wire optical waveguide according to any one of the items (1) to (4), which further contains a step of forming a low refractive index material layer on the optical circuit board, so as to embed therewith the curved end portion of the silicon-based wire optical waveguide.

(6) The method for processing a silicon-based wire optical waveguide according to the item (5), which further contains a step of providing an optical device at the curved end portion.

(7) The method for processing a silicon-based wire optical waveguide according to the item (6), therein the optical device is an optical fiber.

(8) The method for processing a silicon-based wire optical waveguide according to the item (6), therein the optical device is a photodetector.

(9) The method for processing a silicon-based wire optical waveguide according to any one of the items (1) to (8), wherein the ions are Si ions.

(10) The method for processing a silicon-based wire optical waveguide according to any one of the items (1) to (5), wherein the protective film functions as a clad of the silicon-based wire optical waveguide.

(11) The method for processing a silicon-based wire optical waveguide according to the item (5), wherein the protective film is formed of a material having a large mass, and is removed before the step of forming a low refractive index material layer on the optical circuit board, so as to embed therewith the curved end portion of the silicon-based wire optical waveguide.

Advantageous Effects of Invention

According to the invention, at least the silicon-based wire optical waveguide exclusive of the whole or a part of the end portion of the silicon-based wire optical waveguide is protected from invasion of ions with the protective film, and thus the optical transmission loss of the silicon-based wire optical waveguide may be largely reduced.

Furthermore, the end portion of the silicon-based wire optical waveguide that is three-dimensionally curved in a self-aligning manner may be obtained.

BRIEF DESCRIPTION OF DRAWINGS

FIGS. 6(A)-6(E) are illustrations that show an ordinary method for processing a silicon-based wire optical waveguide.

DESCRIPTION OF EMBODIMENTS

First Embodiment

The method for processing a silicon-based wire optical waveguide according to the invention will be described in detail with reference to FIGS. 1(A) to 1(I) below.

Figure 1:
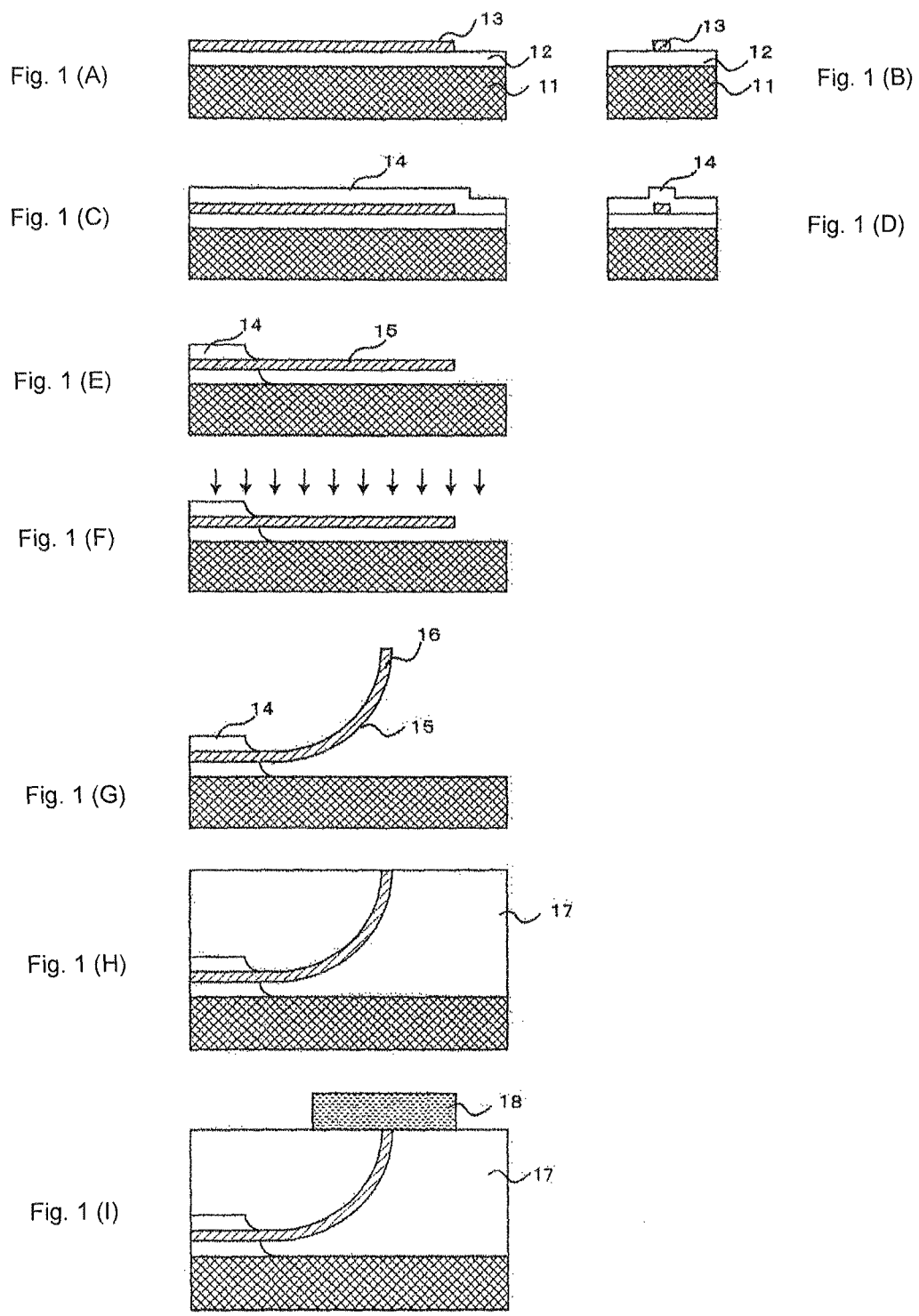
FIGS. 1(A)-1(I) are illustrations that schematically show a first embodiment of the method for processing a silicon-based wire optical waveguide according to the invention.

(1) As shown in FIG. 1(A) and FIG. 1(B), which is a side view thereof, a thermally oxidized silicon film having a thickness, for example, of 3 µm, which is to be a supporting layer 12, is formed on a silicon substrate 11, which is an optical circuit board, and then a silicon layer is formed on the thermally oxidized silicon film to a thickness of from 200 to 250 nm, and processed by using a lithography technique, so as to form a silicon-based wire optical waveguide 13 having a width of from 400 to 1,000 nm.

(2) Subsequently, as shown in FIG. 1(C) and FIG. 1(D), which is a side view thereof, a protective film 14 is formed on the silicon-based wire optical waveguide 13. The protective film 14 used may be, for example, a $SiO_2$ film formed by a CVD method to a thickness of from 500 to 600 nm.

(3) Subsequently, as shown in FIG. 1(E), a part of the supporting layer 12 formed, for example, of a silicon oxide film that is under an end portion 15 of the silicon-based wire optical waveguide 13 and the protective film 14 that is on the end portion 15 of the silicon-based wire optical waveguide 13 are removed by wet etching or dry etching, so as to make such a structure that the end portion 15 of the silicon-based wire optical waveguide 13 thus formed is extended into free space in the form of a cantilever beam from a flat end forming the silicon-based wire optical waveguide.

(4) Subsequently, as shown in FIG. 1(F), the silicon substrate 11 having the cantilever beam structure formed therein is irradiated with an ion beam in a particular direction above the substrate, so as to curve upward over the entire cantilever beam structure, as shown in FIG. 1(G). The suitable irradiation conditions of the ion beam (such as the ion species, the acceleration voltage, and the dose) may be selected, and thereby the end portion 15 of the silicon-based wire optical waveguide 13 that is curved in the ion implantation direction in a self-aligning manner may be extended without excessive curvature thereof. The irradiation may be terminated at a stage before extending to the ion implantation direction, and thereby the extent of curvature may be reduced.

The ion species of the ion beam may be in principle any one that is capable of curving a silicon-based wire optical waveguide, and preferred examples thereof include silicon ions, phosphorus ions, boron ions, and arsenic ions.

In particular, silicon ions may not be used in an ordinary CMOS process, but may have such an advantage that the material of the optical waveguide may be prevented from being deteriorated since silicon ion, which are the same elemental species as the optical waveguide material, are implanted.

Phosphorus ions, boron ions, and arsenic ions are frequently used in ion implantation in a CMOS process and thus have high applicability to an ordinary CMOS process.

For the acceleration voltage of the ion beam, a suitable value may be selected depending on the thickness of the silicon-based wire optical waveguide and the ion species used. For curving upward the cantilever beam structure by the ion beam irradiation, the acceleration voltage may be controlled to such a condition that a collision phenomenon of the irradiation ions used for and the atoms constituting the optical waveguide occurs in a shallow region in the thickness direction of the silicon-based wire optical waveguide within a 50% depth or less from the surface thereof.

In the region irradiated with the ion beam, the atomic density is reduced within a moment to form a difference in atomic density between the irradiated region and the non-irradiated region, and the sparse region shrinks, whereas the dense region extends, so as to form a force for equalizing the difference in density, which functions as a force for curving. Accordingly, the silicon-based wire optical waveguide may be curved upward by irradiating with ions under such an acceleration voltage, condition that the upper surface thereof is a sparse region, and the lower surface thereof is a dense region.

For example, the upper limit of the optimum acceleration energy in the case where the silicon-based wire optical waveguide having a thickness of from 150 to 250 nm is curved with silicon ions is preferably from 80 to 130 keV. In the case where the optical waveguide is irradiated with silicon ions at an acceleration voltage exceeding the range of from 80 to 130 keV, the collision phenomenon may occur over the deep region exceeding 50% from the surface, by which the stress of curving upward and the stress of curving downward are balanced to fail to curve upward consequently.

In the case where the acceleration voltage of silicon ions is lower than a range of from 30 to 50 keV, on the other hand, the force of curving upward may be formed only in a shallow region on the surface, and therefore it may be difficult to curve upward largely unless the irradiation is performed at a considerably large dose.

The upper limit of the optimum acceleration energy in the case where the silicon-based wire optical waveguide having a thickness of from 200 to 250 nm is curved with silicon ions is preferably from 100 to 110 keV. In the case where the optical waveguide is irradiated with silicon ions at an acceleration voltage exceeding the range of from 100 to 110 keV, the stress of curving upward and the stress of curving downward are balanced due to the same reason as above, so as to fail to curve upward consequently. The lower limit of the optimum acceleration voltage may be from 40 to 45 keV since it may be difficult to curve upward largely unless the irradiation is performed at a considerably large dose due to the same reason as above.

Accordingly, such a condition that the intended curved structure is obtained most efficiently, that is, with the smallest dose may be present in a range of from 30 to 130 keV. According to the experimentation performed by the inventors, the optimum value for the silicon-based wire optical waveguide having a thickness of 200 nm may be an acceleration voltage of from 40 to 100 keV, more preferably an acceleration voltage of from 60 to 90 keV, and particularly a value around 80 keV. The optimum value for the silicon wire optical waveguide having a thickness of 220 nm may be an acceleration voltage of from 40 to 110 keV, preferably an acceleration voltage of from 60 to 100 keV, and particularly a value around 90 keV. The optimum value for the silicon wire optical waveguide having a thickness of 250 nm may be an acceleration voltage of from 60 to 130 keV, preferably an acceleration voltage of from 80 to 120 keV, and particularly a value around 110 keV.

However, the optimum acceleration voltage is determined by the distribution form of the region, in which the collision phenomenon of the ions and the atoms occurs, with respect to the depth direction of the optical waveguide, and therefore the optimum acceleration voltage is a parameter that depends on the density of the film constituting the optical waveguide and varies depending on the film forming condition of the film constituting the optical waveguide.

The dose of the ion beam (i.e., the number of ions irradiated per unit area) is a parameter that mainly depends on the length of the silicon-based wire optical waveguide that is to be curved upward, and substantially does not depend on the width of the silicon-based wire optical waveguide. Assuming that the intended curved structure is such a structure that the end portion of the silicon-based wire optical waveguide is directed above with respect to the substrate, the necessary dose is smaller when the silicon-based wire optical waveguide is longer, whereas the necessarily dose is larger when the optical waveguide is shorter.

However, for determining the dose for providing the intended shape, it is also necessary to determine the acceleration voltage for curving most efficiently. As shown in the examples described later, in the experimentation performed by the inventors, the optimum dose may be in the order of $10^{15}$ cm$^{-2}$.

The acceleration voltage and the dose described herein are only examples, and the suitable acceleration voltage and dose may be controlled depending on the thickness of the waveguide.

(5) When the silicon-based wire optical waveguide remains in the curved state as shown in FIG. 1(G), the curved portion is liable to be damaged by an external impact or the like, and it may be difficult to attach another optical device thereto. Accordingly, as shown in FIG. 1(H), the surrounding of the silicon-based wire optical waveguide including a terminal 16 of the curved silicon-based wire optical waveguide may be protected and reinforced by embedding with a low refractive index material layer 17, such as a resin or glass.

In the case where the protective film 14 is a material that functions as a clad of the silicon-based wire optical waveguide, such as a SiO$_2$ film, the protective film 14 may not be removed necessarily and may be used as it is, but in the case where the protective film 14 is formed of a material having a large mass, such as a metal, it may be necessarily removed before embedding with a low refractive index material layer 17, such as a resin or glass.

In the case where then the terminal 16 of the silicon-based wire optical waveguide has a planar pattern and is processed into a reverse taper shape, for example, a silicon nitride film may be formed around the terminal 16 by CVD after the step shown in FIG. 1(G) and may be used as a second core material. According to the procedure, the optical coupling efficiency to an optical fiber may be enhanced.

The thickness of the protective film 14 in the first embodiment may be selected to obtain such a thickness that the irradiated ions do not penetrate through the protective film. For the silicon-based wire optical waveguide having a thickness of from 220 to 250 nm, in the case where the protective film is SiO$_2$ for example, it is sufficient that the thickness of the protective film is 500 nm or more.

Figure 5:
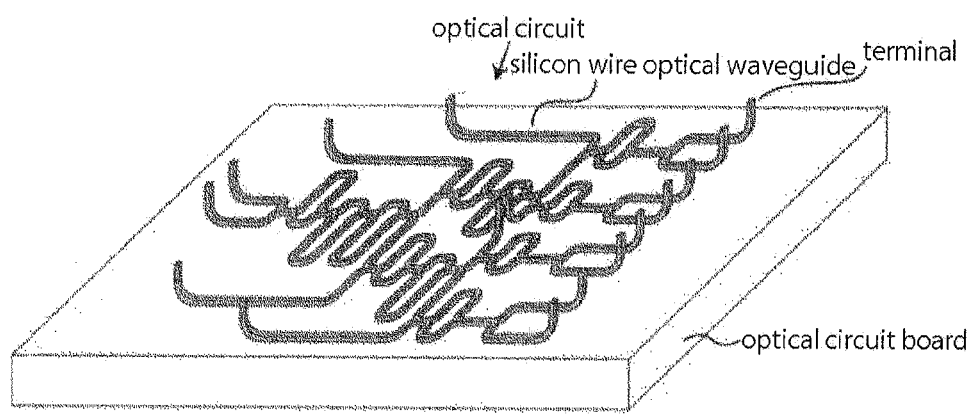
FIG. 5 is a conceptual illustration that shows achievement of input and output of light from the above by curving upward an end portion of a silicon-based wire optical waveguide in an optical circuit having a silicon-based wire optical waveguide as a major constitutional component.

In the first embodiment, as compared to the ordinary processing method shown in FIG. 5, the silicon-based wire optical waveguide 13 except for the end portion 15 of the silicon-based wire optical waveguide 13 is protected by the protective film from invasion of ions, and therefore the optical transmission loss may be largely reduced.

(6) Furthermore, as shown in FIG. 1(I), after embedding with the low refractive index material layer 17, such as a resin or glass, an optical device 18, such as a photodetector and an optical fiber, may be provided in the direction, in which the curved silicon-based wire optical waveguide is extended, and thereby optical signals may be coupled between the silicon-based wire optical waveguide and the optical device.

In the case where the optical device 18 is a photodetector, the light output from the silicon-based wire optical waveguide may be received by an optical receiver, and in the case where the optical device is a light source device, such as a semiconductor laser, the light output from the light source device may be input to the silicon-based wire optical waveguide.

In the case where the optical device 18 is an optical fiber, the light output from the optical fiber may be input to the silicon-based wire optical waveguide, or conversely the light output from the silicon-based wire optical waveguide may be input to the optical fiber.

Second Embodiment

Another embodiment of the method for processing a silicon-based wire optical waveguide according to the invention will be described with reference to FIGS. 2(A) to 2(H) below.

Figure 2:
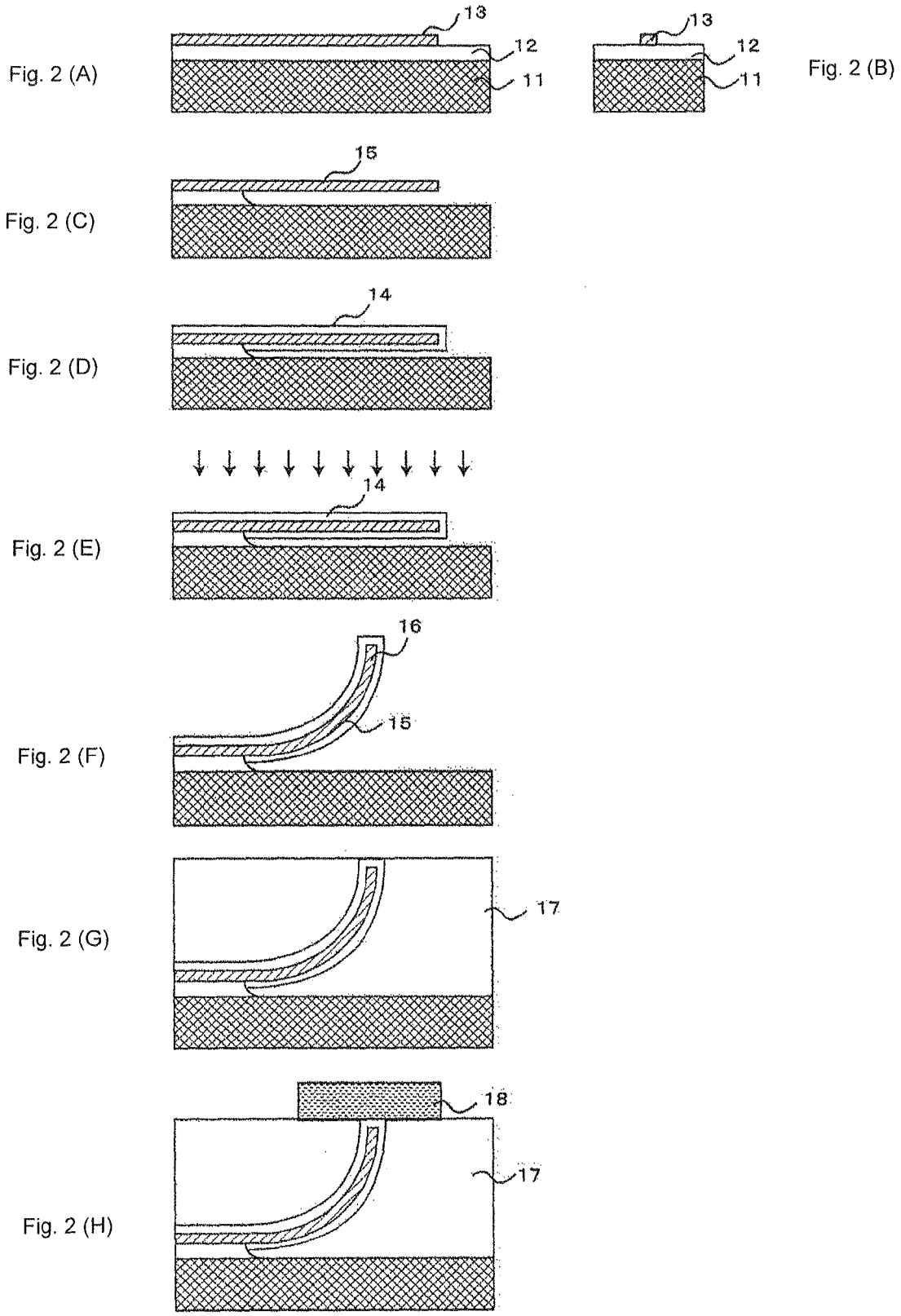
FIGS. 2(A)-2(H) are illustrations that schematically show a second embodiment of the method for processing a silicon-based wire optical waveguide according to the invention.

The process step in FIG. 2(A) and FIG. 2(B), which is a side view thereof, and the process steps in FIGS. 2(E) to 2(H) are substantially the same as in the first embodiment, and the detailed description thereof are omitted.

In the second embodiment, subsequent to the process step in FIG. 2(A) and FIG. 2(B), which is a side view thereof, the supporting layer 12 that is under the end portion 15 of the silicon-based wire optical waveguide 13 is removed to make a cantilever beam structure, as shown in FIG. 2(C).

Subsequently, as shown in FIG. 2(D), a protective film 14 is formed around the cantilever beam structure and on the silicon-based wire optical waveguide 14, for example, by a CVD method.

Subsequently, as shown in FIG. 2(E), the silicon substrate 11 having the cantilever beam structure formed therein is irradiated with an ion beam in a particular direction above the substrate, so as to curve upward over the entire cantilever beam structure, as shown in FIG. 2(F).

When the silicon-based wire optical waveguide remains in the curved state as shown in FIG. 2(F), the curved portion is liable to be damaged by an external impact or the like, and it may be difficult to attach another optical device thereto. Accordingly, as shown in FIG. 2(G), the surrounding of the silicon-based wire optical waveguide including a terminal 16 of the curved silicon-based wire optical waveguide may be protected and reinforced by embedding with a low refractive index material layer 17, such as a resin or glass.

In the case where the protective film 14 is a material that functions as a clad of the silicon-based wire optical waveguide, such as a $SiO_2$ film, the protective film 14 may not be necessarily removed and may be used as it is, but in the case where the protective film 14 is formed of a material having a large mass, such as a metal, it may be necessarily removed before embedding with a low refractive index material layer 17, such as a resin or glass.

Furthermore, as shown in FIG. 2(H), as similar to the first embodiment, after embedding with the low refractive index material layer 17, such as a resin or glass, an optical device 18, such as a photodetector and an optical fiber, may be provided in the direction, in which the curved silicon-based wire optical waveguide is extended, and thereby optical signals may be coupled between the silicon-based wire optical waveguide and the optical device.

In the case where the thickness of the protective film 14 in the second embodiment is too large, the necessary radiation energy may be increased, which requires a high energy ion implantation device. Accordingly, it may be practical that the thickness of the protective film is reduced to allow the ion penetration to a certain extent, and the ion implantation is performed with low energy.

Third Embodiment

Another embodiment of the method for processing a silicon-based wire optical waveguide according to the invention will be described with reference to FIGS. 3(A) to 3(H) below.

The third embodiment is a modified embodiment of the first and second embodiments.

The process steps of FIGS. 3(A) to 3(E) are substantially the same as in the first embodiment, and the detailed description thereof are omitted.

Figure 3:
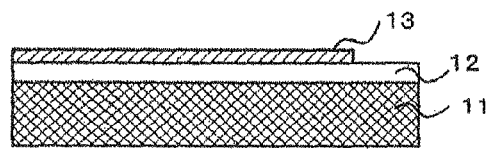
FIGS. 3(A)-3(H) are illustrations that schematically show a third embodiment of the method for processing a silicon-based wire optical waveguide according to the invention.
Figure 3:
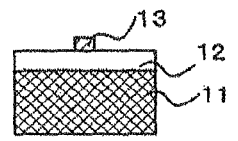
Figure 3:
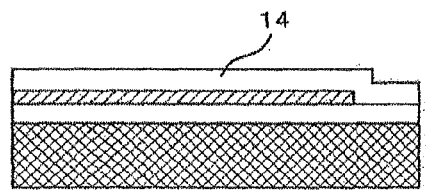
Figure 3:
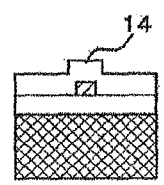
Figure 3:
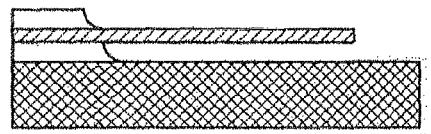
Figure 3:
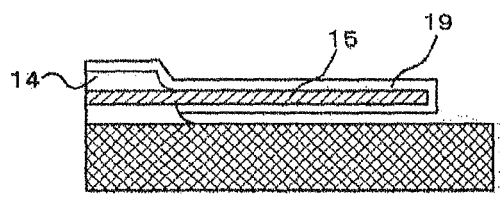
Figure 3:
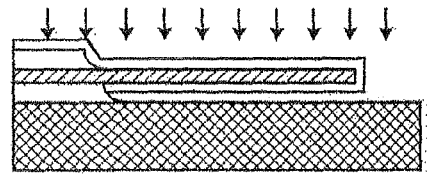
Figure 3:
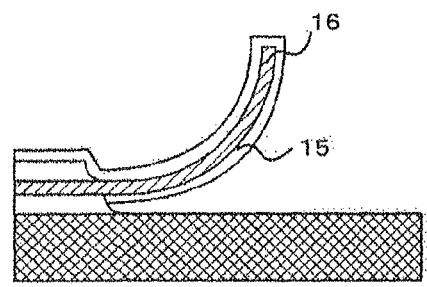

In the third embodiment, subsequent to the process step in FIG. 3(E), a second protective film 19 is formed around the cantilever beam structure and on the silicon-based wire optical waveguide 13, for example, by a CVD method, as shown in FIG. 3(F).

Subsequently, as shown in FIG. 3(G), the silicon substrate 11 having the cantilever beam structure formed therein is irradiated with an ion beam in a particular direction above the substrate, so as to curve the end portion 15 of the silicon-based wire optical waveguide 13, as shown in FIG. 3(H).

The thickness of the second protective film 19 in the third embodiment may be selected to obtain such a thickness that the irradiated ions do not penetrate through the protective film. For the silicon-based wire optical waveguide having a thickness of from 220 to 250 nm, in the case where the second protective film 19 is $SiO_2$ for example, it is sufficient that the thickness of the second protective film 19 is 500 nm or more.

When the silicon-based wire optical waveguide remains in the curved state as shown in FIG. 3(H), the curved portion is liable to be damaged by an external impact or the like, and it may be difficult to attach another optical device thereto. Accordingly, while not shown in the figures, as similar to the first and second embodiments, the surrounding of the silicon-based wire optical waveguide including a terminal 16 of the curved silicon-based wire optical waveguide may be protected and reinforced by embedding with a low refractive index material layer, such as a resin or glass.

In the case where the protective film 14 or the second protective film 19 is a material that functions as a clad of the silicon-based wire optical waveguide, such as a $SiO_2$ film, the protective film 14 or the second protective film 19 may not be necessarily removed and may be used as it is, but in the case where the protective film 14 or the second protective film 19 is formed of a material having a large mass, such as a metal, it may be necessarily removed before embedding with a low refractive index material layer, such as a resin or glass.

Furthermore, as similar to the first and second embodiments, after embedding with the low refractive index material layer, such as a resin or glass, an optical device, such as a photodetector and an optical fiber, may be provided in the direction, in which the curved silicon-based wire optical waveguide is extended, and thereby optical signals may be coupled between the silicon-based wire optical waveguide and the optical device.

Fourth Embodiment

Another embodiment of the method for processing a silicon-based wire optical waveguide according to the invention will be described with reference to FIGS. 4(A) to 4(I) below.

The process steps of FIGS. 4(A) to 4(D) and the process steps of FIGS. 4(F) to 4(I) are substantially the same as in the second embodiment, and the detailed description thereof are omitted.

Figure 4:
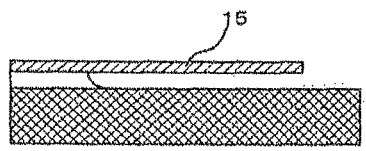
FIGS. 4(A)-4(I) are illustrations that schematically show a fourth embodiment of the method for processing a silicon-based wire optical waveguide according to the invention.
Figure 4:
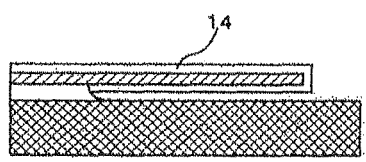
Figure 4:
Figure 4:
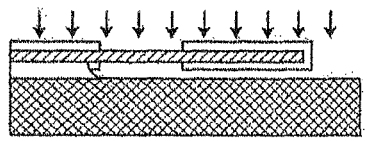
Figure 4:
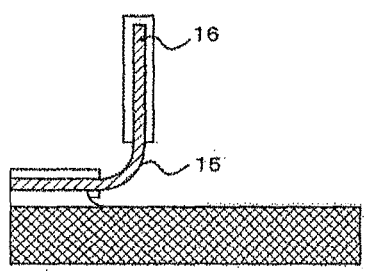
Figure 4:
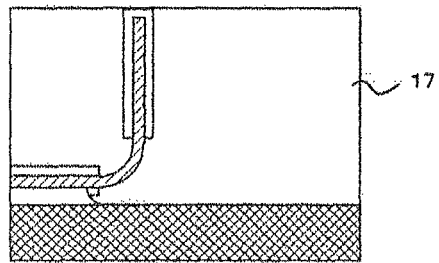
Figure 4:
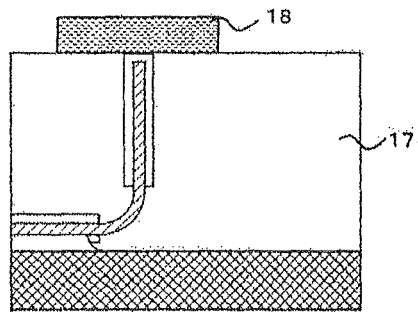

In the fourth embodiment, subsequent to the process steps in FIGS. 4(A) to 4(D), a part of the protective film 14 on the end portion 15 of the silicon-based wire optical waveguide 13 having the cantilever beam structure is removed as shown in FIG. 4(E).

Subsequently, as shown in FIG. 4(F), the silicon substrate 11 having the cantilever beam structure formed therein is irradiated with an ion beam in a particular direction above the substrate, so as to curve a part of the end portion 15 of the silicon-based wire optical waveguide 13, as shown in FIG. 4(G).

The thickness of the protective film 14 in the fourth embodiment may be selected to obtain such a thickness that the irradiated ions do not penetrate through the protective film. For the silicon-based wire optical waveguide having a thickness of from 220 to 250 nm, in the case where the protective film is $SiO_2$ for example, it is sufficient that the thickness of the protective film is 500 nm or more.

When the silicon-based wire optical waveguide remains in the curved state as shown in FIG. 4(G), the curved portion is liable to be damaged by an external impact or the like, and it may be difficult to attach another optical device thereto. Accordingly, as shown in FIG. 4(H), the surrounding of the silicon-based wire optical waveguide including a terminal 16 of the curved silicon-based wire optical waveguide may be protected and reinforced by embedding with a low refractive index material layer 17, such as a resin or glass.

In the case where the protective film 14 is a material that functions as a clad of the silicon-based wire optical waveguide, such as a $SiO_2$ film, the protective film 14 may not be necessarily removed and may be used as it is, but in the case where the protective film 14 is formed of a material having a large mass, such as a metal, it may be necessarily removed before embedding with a low refractive index material layer 17, such as a resin or glass.

Furthermore, as shown in FIG. 4(I), as similar to the first to third embodiments, after embedding with the low refractive index material layer 17, such as a resin or glass, an optical device 18, such as a photodetector and an optical fiber, may be provided in the direction, in which the curved silicon-based wire optical waveguide is extended, and thereby optical signals may be coupled between the silicon-based wire optical waveguide and the optical device.

The fourth embodiment may have the following advantages as compared to the first to third embodiments.

(1) A steeper curved portion than the first to third embodiment may be formed.

(2) The ions may be effectively implanted to the part where the protective layer is removed, and the curved portion may be formed with a lower dose than those in the second and third embodiments.

(3) The protective film is also formed on the part of the end portion of the wire optical waveguide, and thus the optical transmission loss may be smaller than that in the first embodiment.

The embodiments described herein are only examples shown for facilitating comprehension of the invention, and the invention is not limited to the embodiments.

Therefore, the invention may be subjected to appropriate design changes on processing a silicon-based wire optical waveguide without departing from the scope of claim.

For example, the silicon-based material used for the core structure of the wire optical waveguide in the invention is not limited to crystalline silicon but may be amorphous silicon. In the case where amorphous silicon is used, hydrogenated amorphous silicon is preferred for reducing the absorption loss of the material, but materials having other elements than silicon, such as carbon and germanium, added thereto may also be used.

Furthermore, the similar advantageous effects as in the aforementioned embodiments may be obtained even when using, as the silicon-based material used for the core structure of the wire optical waveguide in the invention, a first core material, such as crystalline silicon, and used which covers a silicon compound, such as silicon oxide, silicon nitride and silicon oxynitride, as a second core material.

REFERENCE SIGN LIST 1 silicon substrate
2 supporting layer
3 silicon-based wire optical waveguide
4 end portion of silicon-based wire optical waveguide
11 silicon substrate
12 supporting layer
13 silicon-based wire optical waveguide
14 protective film
15 end portion of silicon-based wire optical waveguide
16 terminal of silicon-based wire optical waveguide
17 low refractive index material layer
18 optical device
19 second protective film

The invention claimed is:

1. A method for processing a silicon-based wire optical waveguide, comprising a step of preparing an optical circuit board having plural silicon-based wire optical waveguides formed through a supporting layer; a step, for silicon-based wire optical waveguide that has an end portion among the silicon-based wire optical waveguides, of removing the supporting layer that is under the end portion of the silicon-based wire optical waveguide; a step of forming a protective film selectively on the silicon-based wire optical waveguide exclusive of the end portion of the silicon-based wire optical waveguide; and a step of implanting ions to the silicon-based wire optical waveguide in a particular direction, so as to curve the end portion of the silicon-based wire optical waveguide to the particular direction in a self-aligned manner.

2. A method for processing a silicon-based wire optical waveguide, comprising a step of preparing an optical circuit board having plural silicon-based wire optical waveguides formed through a supporting layer; a step, for a silicon-based wire optical waveguide that has an end portion among the silicon-based wire optical waveguides, of removing the supporting layer that is under the end portion of the silicon-based wire optical waveguide; a step of forming a protective film on the silicon-based wire optical waveguide inclusive of the end portion of the silicon-based wire optical waveguide; and a step of implanting ions to the silicon-based wire optical waveguide in a particular direction, so as to curve the end portion of the silicon-based wire optical waveguide to the particular direction in a self-aligned manner.

3. The method according to claim 1, including a step of forming a second protective film on the end portion of the silicon-based wire optical waveguide and the protective film before the step of implanting ions to the silicon-based wire optical waveguide in a particular direction, so as to curve the end portion of the silicon-based wire optical waveguide to the particular direction in a self-alignment manner.

4. The method according to claim 2, including a step of selectively removing a part of the protective film that is on the end portion of the silicon-based wire optical waveguide; before the step of implanting ions to the silicon-based wire optical waveguide in a particular direction, so as to partially curve the end portion of the silicon-based wire optical waveguide to the particular direction in a self-alignment manner.

5. The method for processing a silicon-based wire optical waveguide according to any one of claim 1, which further comprises a step of forming a low refractive index material layer comprising a resin or a glass on the optical circuit board, so as to embed therewith the curved end portion of the silicon-based wire optical waveguide.

6. The method for processing a silicon-based wire optical waveguide according to claim 5, which further comprises a step of providing an optical device at the curved end portion.

7. The method for processing a silicon-based wire optical waveguide according to claim 6, wherein the optical device is an optical fiber.

8. The method for processing a silicon-based wire optical waveguide according to claim 6, wherein the optical device is a photodetector.

9. The method for processing a silicon-based wire optical waveguide according to claim 1, wherein the ions are Si ions.

10. The method for processing a silicon-based wire optical waveguide according to claim 1, wherein the protective film functions as a clad of the silicon-based wire optical waveguide.

11. The method for processing a silicon-based wire optical waveguide according to claim 5, wherein the protective film is formed of a material having a large mass comprising a metal, and is removed before the step of forming a low refractive index material layer on the optical circuit board, so as to embed therewith the curved end portion of the silicon-based wire optical waveguide.

12. The method for processing a silicon-based wire optical waveguide according to claim 2, which further comprises a step of forming a low refractive index material layer comprising a resin or glass on the optical circuit board, so as to embed therewith the curved end portion of the silicon-based wire optical waveguide.

13. The method for processing a silicon-based wire optical waveguide according to claim 12, which further comprises a step of providing an optical device at the curved end portion.

14. The method for processing a silicon-based wire optical waveguide according to claim 13, wherein the optical device is an optical fiber.

15. The method for processing a silicon-based wire optical waveguide according to claim 13, wherein the optical device is a photodetector.

16. The method for processing a silicon-based wire optical waveguide according to claim 2, wherein the ions are Si ions.

17. The method for processing a silicon-based wire optical waveguide according to claim 2, wherein the protective film functions as a clad of the silicon-based wire optical waveguide.

18. The method for processing a silicon-based wire optical waveguide according to claim 12, wherein the protective film is formed of a material having a large mass comprising a metal, and is removed before the step of forming a low refractive index material layer comprising a resin or glass on the optical circuit board, so as to embed therewith the curved end portion of the silicon-based wire optical waveguide.

* * * * *